US008240042B2

(12) United States Patent
Williams et al.

(10) Patent No.: US 8,240,042 B2
(45) Date of Patent: Aug. 14, 2012

(54) METHODS OF MAINTAINING TURBINE DISCS TO AVERT CRITICAL BUCKET ATTACHMENT DOVETAIL CRACKS

(75) Inventors: Andrew D. Williams, Balcraig (GB); William Calder, Dalgety Bay (GB); John Walsh, Franklin, TN (US)

(73) Assignee: Wood Group Heavy Industrial Turbines AG, Neuenhof (CH)

( * ) Notice: Subject to any disclaimer, the term of this patent is extended or adjusted under 35 U.S.C. 154(b) by 765 days.

(21) Appl. No.: 12/463,931

(22) Filed: May 11, 2009

(65) Prior Publication Data

US 2009/0282678 A1    Nov. 19, 2009

Related U.S. Application Data

(60) Provisional application No. 61/052,366, filed on May 12, 2008.

(51) Int. Cl.
*B23P 6/00* (2006.01)

(52) U.S. Cl. ........................ 29/889.1; 228/119

(58) Field of Classification Search ................. None
See application file for complete search history.

(56) References Cited

U.S. PATENT DOCUMENTS

| | | | | |
|---|---|---|---|---|
| 3,490,852 A | * | 1/1970 | Farrell et al. | 416/95 |
| 3,936,227 A | * | 2/1976 | Wojcik | 416/95 |
| 4,008,844 A | | 2/1977 | Duvall et al. | |
| 4,073,639 A | | 2/1978 | Duvall et al. | |
| 4,078,922 A | | 3/1978 | Magyar et al. | |
| 4,400,137 A | * | 8/1983 | Miller et al. | 416/220 R |
| 4,914,872 A | | 4/1990 | Snyder et al. | |
| 5,141,401 A | | 8/1992 | Juenger et al. | |
| 5,197,191 A | | 3/1993 | Dunkman et al. | |
| 5,525,429 A | * | 6/1996 | Mannava et al. | 428/610 |
| 5,972,424 A | * | 10/1999 | Draghi et al. | 427/142 |
| 6,033,185 A | | 3/2000 | Lammas et al. | |
| 6,120,249 A | | 9/2000 | Hultgren et al. | |
| 6,183,202 B1 | | 2/2001 | Ganshaw | |
| 6,190,128 B1 | | 2/2001 | Fukuno et al. | |

(Continued)

OTHER PUBLICATIONS

"Gas Turbine Wheel Dovetail Cracking in GE 7FA and 9FA Models", Electric Power Research Institute, www.epri.com, product ID 101440, Aug. 2006.
GE Technical Information Letter 1539-2, GE Energy Services Engineering Product Service, Apr. 4, 2006.
GE Technical Information Letter 1540-2, GE Energy Services Engineering Product Service, Apr. 4, 2006.

(Continued)

*Primary Examiner* — Kiley Stoner
(74) *Attorney, Agent, or Firm* — Baker Botts L.L.P.

(57) ABSTRACT

Methods of to maintaining turbine discs prone to cracks in bucket attachment dovetails are disclosed. In one embodiment, wherein a turbine disc comprises a plurality of bucket attachment dovetail regions, one or more of the bucket attachment dovetail regions comprises a cooling slot, and each cooling slot comprises edges and adjacent surfaces, a method comprises inspecting the one or more of the bucket attachment dovetail regions comprising a cooling slot to confirm that each bucket attachment dovetail region meets predetermined minimum standards. The method further comprises blending the edges of the at least one of the cooling slots. The method further comprises polishing the edges of the at least one of the cooling slots. The method further comprises peening the edges of the at least one of the cooling slots. The method further comprises coating the edges and adjacent surfaces of at least one of the cooling slots.

20 Claims, 7 Drawing Sheets

U.S. PATENT DOCUMENTS

| | | | |
|---|---|---|---|
| 6,375,423 B1 * | 4/2002 | Roberts et al. | 416/2 |
| 6,494,683 B1 * | 12/2002 | Nolan et al. | 416/219 R |
| 6,532,656 B1 | 3/2003 | Wilkins et al. | |
| 6,778,937 B2 | 8/2004 | Cleary | |
| 6,837,685 B2 | 1/2005 | Pierre | |
| 6,902,376 B2 | 6/2005 | Gautreau et al. | |
| 6,952,094 B1 * | 10/2005 | Viertl | 324/238 |
| 7,104,759 B2 | 9/2006 | Tipton et al. | |
| 7,121,803 B2 | 10/2006 | Gautreau et al. | |
| 7,156,621 B2 | 1/2007 | Stone | |
| 7,162,373 B1 | 1/2007 | Kadioglu et al. | |
| 7,165,944 B2 | 1/2007 | Gautreau et al. | |
| 7,217,099 B2 | 5/2007 | Casanova et al. | |
| 7,506,440 B2 * | 3/2009 | Bruce | 29/889.2 |
| 7,723,636 B2 * | 5/2010 | Ochiai et al. | 219/69.17 |
| 8,122,600 B2 * | 2/2012 | Kinstler et al. | 29/889.1 |
| 2002/0124402 A1 * | 9/2002 | Berthelet et al. | 29/889.1 |
| 2004/0258192 A1 * | 12/2004 | Angeliu et al. | 376/305 |
| 2006/0277753 A1 * | 12/2006 | Ntsama-Etoundi et al. | 29/889.1 |
| 2007/0048130 A1 | 3/2007 | Sullivan et al. | |
| 2007/0175030 A1 * | 8/2007 | Luna et al. | 29/889.2 |
| 2007/0269313 A1 | 11/2007 | Nadvit et al. | |
| 2007/0269316 A1 | 11/2007 | Williams et al. | |
| 2009/0022592 A1 * | 1/2009 | Liotta et al. | 416/220 R |
| 2009/0308123 A1 * | 12/2009 | Stonitsch et al. | 72/53 |
| 2009/0313823 A1 * | 12/2009 | Rockstroh et al. | 29/889.1 |

OTHER PUBLICATIONS

"CTOTF tackles the tough issues, including 7FA R0 and mid-compressor failures," Combustion Turbine Operations Task Force, Combined Cycle Journal, www.CTOTF.org, $1^{st}$ Qtr 2007.

"Development of Repair or Refurbishment Criteria for the MS 7001F, Part 2: Investigation of Row 1 Disc Slot Cracking," Wood Group PTC, Inc., Turbine Technology International, Rochester, NY, Jun. 6 2007.

"Experience, ideas shared by colleagues benefit all in attendance," Combustion Turbine Operations Task Force, Combined Cycle Journal, www.CTOTF.org, $2^{nd}$ Qtr 2007.

SermeTel® Process 2F-1 Coating System product brochure, Apr. 2008.

"Gas Turbine Services—Compressor and Rotor Issues," GE Frame 6FA User Conference, May 13, 2008.

IPCote Range of Sacrificial Aluminum Coatings web page, 2009.

International Search Report for PCT/US2011/032868, dated Jul. 7, 2011.

* cited by examiner

METHODS OF MAINTAINING TURBINE DISCS TO AVERT CRITICAL BUCKET ATTACHMENT DOVETAIL CRACKS

CROSS-REFERENCE TO RELATED APPLICATIONS

This application claims benefit of U.S. Provisional Patent Application Ser. No. 61/052,366, filed May 12, 2008, which is hereby incorporated by reference in its entirety.

BACKGROUND

The present invention relates generally to maintaining gas turbine engines, and more particularly, to maintaining turbine discs prone to cracks in bucket attachment dovetails.

As shown in FIG. 1, a gas turbine 10 may have a combustion section 12 in a gas flow path between a compressor 14 and a turbine 16. The combustion section 12 may include an annular array of combustion chambers 20, e.g., combustion cans. The turbine 16 may be coupled to rotationally drive the compressor 14 and a power output drive shaft 18. Air may enter the gas turbine 10 and pass through the compressor 14. Temperatures in the compressor 14 may range from ambient temperature to about 800° F. Pressures in the compressor 14 may range from local atmospheric pressure to about 228 pounds per square inch ("psi"). High pressure air from the compressor 14 may enter the combustion section 12 where it may mix with fuel and burn. High energy combustion gases may exit the combustion section 12 to power the turbine 16 which, in turn, may drive the compressor 14 and the output power shaft 18. Temperatures in the turbine 16 may range from about 2540° F. at the inlet to about 1200° F. at the exhaust. Pressures in the turbine 16 may range from about 15 psi to about 200 psi. The extreme temperature and pressure environment of a turbine may present a number of challenges for manufacture and maintenance of turbine components.

The turbine 16 of the gas turbine 10 typically has multiple sets or stages of stationary blades, known as nozzles or vanes, and moving blades, known as rotor blades or buckets. At each stage, the buckets (not shown) may be mounted on a turbine disc 22, as illustrated in FIG. 2. The buckets may attach to the turbine disc 22 with dovetails 24. As illustrated in FIG. 3, the stages of turbine discs 22 may be aligned coaxially. The first stage of the turbine 16 is the section immediately adjacent to the combustion section 12 of the gas turbine 10 and, thus, is the region of the turbine 16 that is exposed to the highest temperatures. Similarly, the second stage of the turbine 16 is the section immediately adjacent to the first stage, and so forth for each stage.

High thermal gradients may exist from the dovetails 24 on the radial perimeter of the turbine disc 22 to the interior regions of the turbine disc 22, with the most severe gradients present in the first stage. Unaddressed, such thermal gradients may create metal fatigue, deformations, and/or cracks in the turbine disc 22. Therefore, as seen in FIG. 4, cooling slots 26 may extend from the interior regions of the turbine disc 22 through the dovetails 24 to provide thermal relief at the dovetail regions of the turbine disc 22.

FIG. 4A illustrates the dovetail region for a typical first stage turbine disc, while FIG. 4B illustrates the same for a typical second stage turbine disc. As shown in FIG. 5, a known problem with turbine discs 22 comprising such cooling slots 26 is cracking 28 at the cooling slots 26. It is believed in the industry that such cracking is not amenable to repair. With tensile stresses and temperatures during normal operation, crack initiation can expose the alloy of the disc 22 to oxidation along its grain boundaries. This phenomenon is known as stress-accelerated grain boundary oxidation ("SAGBO"). With continued exposure, this crack propagation may result in liberation of the bucket attachment dovetail and the bucket, causing extensive hot gas path damage. The estimated costs of catastrophic disc failure can exceed $10 million in direct equipment damage alone, with the gross damage estimates as high as $20 million. Therefore, identification of cracks in the dovetail region has heretofore necessitated replacement of the turbine disc 22. As has been experienced in the industry, such cracking 28 in the dovetail region may reduce the useful life of a disc from approximately 20 years to less than 4 years. In addition to the $6-8 million cost of replacing the turbine disc 22, replacement costs may also include those for plant shutdown and outage, locating and acquiring a replacement disc, and de-stacking and re-stacking the rotor.

Moreover, identification of cracks in the dovetail region may pose challenges. Inspection of this region of the turbine disc 22 has not been typically incorporated into standard maintenance routines, so standard tools and procedures are lacking. Costs of de-stacking and re-stacking the rotor may create a preference for in situ inspection. Visual inspecting for cracking 28 with linear dimensions of less than several thousandths of an inch may require expensive magnification and logging equipment. Additionally, the geometry of the dovetail region may necessitate specialized equipment, such as conforming probes, to perform the inspections.

Actions which have been proposed to help avoid crack initiation may include edge blending, shot-peening, bucket root modifications, and contouring of the slot corners to reduce stress. See "Technical Information Letter 1539-2", GE Engineering Product Service, Apr. 4, 2006; "Technical Information Letter 1540-2", GE Engineering Product Service, Apr. 4, 2006; U.S. Pat. No. 5,141,401; and U.S. Patent Application Publication No. 2007/0269316. Shot-peening (also referred to as "peening") is a process wherein the surface of a workpiece may be impacted by particles or shot. Peening may generate a residual compressive stress in the metal surface, which is thought to improve fatigue resistance. Thus, localized areas of tensile stress, phase transformations, machine and grinding marks, pits, scratches, and the like, may be effectively eliminated from acting as stress concentration points.

In an effort to identify potential cracking damage, an Original Equipment Manufacturer ("OEM") has suggested that eddy current inspections should be performed at each hot gas path inspection interval and at major inspection intervals. See "Technical Information Letter 1539-2", GE Engineering Product Service, Apr. 4, 2006; and "Technical Information Letter 1540-2", GE Engineering Product Service, Apr. 4, 2006. Turbine operators have expressed concerns that the bucket attachment dovetail cracking problem has not been significantly mitigated by the measures proposed to date. This may be due to the fact that the causes and mechanisms of cracking in the bucket attachment dovetail region are not well understood in the industry.

Coatings and fillers have been utilized on various gas turbine engine components to provide thermal barriers, wear resistance, or corrosion protection. Many coatings, which may be suitable for the lower temperature and lower pressure environment of the compressor, may fail in the higher temperature and higher pressure environment of the turbine. Additionally, many coatings may not be suitable for the extreme thermal gradients present in a cooling slot of a turbine bucket attachment dovetail region. Selection and utilization of an appropriate coating or filler would require a thorough understanding of the causes and mechanisms of the cracking in the bucket attachment dovetail region.

SUMMARY

The present invention relates generally to maintaining gas turbine engines, and more particularly, to maintaining turbine discs prone to cracks in bucket attachment dovetails.

One embodiment of the present invention provides a method for maintaining a turbine disc, wherein the turbine disc comprises a plurality of bucket attachment dovetail regions, one or more of the bucket attachment dovetail regions comprises a cooling slot, and each cooling slot comprises edges and adjacent surfaces. The method comprises blending the edges of the at least one of the cooling slots creating blended edges. The method further comprises polishing the edges of the at least one of the cooling slots creating polished edges. The method further comprises peening the edges of the at least one of the cooling slots creating peened edges. The method further comprises coating the edges and adjacent surfaces of at least one of the cooling slots creating coated edges and adjacent surfaces.

Another embodiment provides a method of maintaining a gas turbine, wherein the gas turbine comprises one or more turbine discs, at least one of the turbine discs comprises a plurality of bucket attachment dovetail regions, one or more of the bucket attachment dovetail regions comprises a cooling slot, and each cooling slot comprises edges and adjacent surfaces. The method comprises blending the edges of the at least one of the cooling slots creating blended edges. The method further comprises polishing the edges of the at least one of the cooling slots creating polished edges. The method further comprises peening the edges of the at least one of the cooling slots creating peened edges. The method further comprises coating the edges and adjacent surfaces of at least one of the cooling slots creating coated edges and adjacent surfaces.

Another embodiment provides a method of maintaining a turbine disc bucket attachment dovetail region, wherein the bucket attachment dovetail region comprises a cooling slot, and the cooling slot comprises edges and adjacent surfaces. The method comprises blending the edges of the at least one of the cooling slots only if each of the bucket attachment dovetail regions comprising a cooling slot meets the predetermined minimum standards. The method further comprises polishing the blended edges of the at least one of the cooling slots. The method further comprises peening the polished edges of the at least one of the cooling slots. The method further comprises coating the peened edges and adjacent surfaces of at least one of the cooling slots, wherein coating the edges and adjacent surfaces of at least one of the cooling slots comprises applying a coating compound, wherein the coating compound comprises is rich in aluminum.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates generally to maintaining gas turbine engines, and more particularly, to maintaining turbine discs prone to cracks in bucket attachment dovetails.

Figure 6:
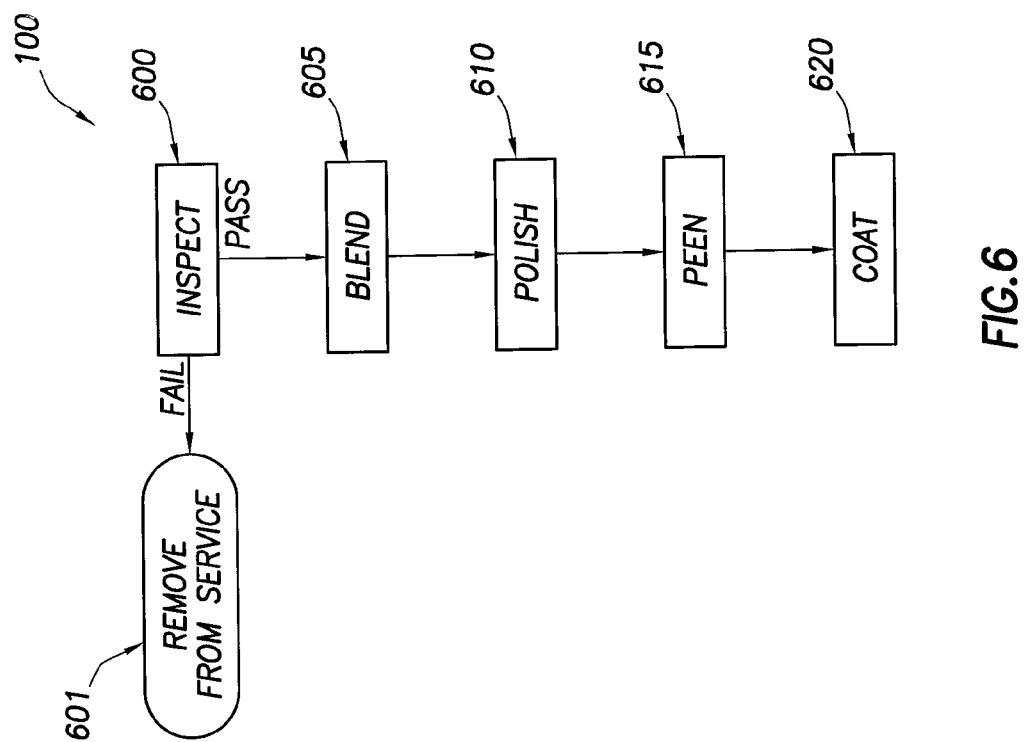
FIG. 6 is a diagram of a method of maintaining a turbine disc in accordance with one embodiment of the present invention.

Referring to FIG. 6, one aspect of the invention includes a method of turbine disc maintenance 100 which may include regularly scheduled inspections 600 during the operational life of a turbine disc, which, in some instances, is a first or second stage turbine disc. Such inspections 600 may be scheduled to coincide with each Hot Gas Path Inspection. Such inspections 600 may be scheduled to coincide with each Major Inspection interval. The inspections 600 may comprise non-destructive inspection techniques such as, for example, eddy current inspections of bucket attachment dovetails of a turbine. Preparation of the turbine disc for the eddy current inspection may proceed according to industry standard methods, including cleaning the turbine disc with a $CO_2$ blast. In other embodiments, the inspections 600 of the bucket attachment dovetails may be fluorescent penetrant inspections, phased-array ultrasonic inspection, x-ray inspections, and any other appropriate testing method known in the industry. Turbine discs which fail to meet certain predetermined minimum standards may be removed from service at 601. For example, suitable predetermined minimum standards may comprise indications of cracks in the bucket attachment dovetail regions. As would be understood by one of ordinary skill in the art with the benefit of this disclosure, indications of cracks may comprise any linear feature of approximately 1 millimeter or longer.

In the embodiment of the invention illustrated by method 100, following inspection 600 (wherein discs which fail to meet certain predetermine minimum standards may be removed from service at 601), a blending process 605 may be applied to the edges of the cooling slots in one or more of the bucket attachment dovetail regions to create and/or expand an edge radius. Any appropriate blending technique known in the art may be used. See, for example, U.S. Pat. No. 5,197, 191. In some embodiments, the edges may be blended to a radius of about 1 mm to about 5 mm. In one embodiment, the edges may be blended to a radius of about 1 mm to about 3 mm. In another embodiment, the edges may be blended to a radius of about 3 mm to about 5 mm. In yet another embodiment, the edges may be blended to a radius R' which is between about 25% and about 75% of the original radius R.

In the embodiment of the invention illustrated by method 100, following blending 605, the edges of the cooling slots in one or more of the bucket attachment dovetail regions may be polished 610. This may have the effect of reducing tool marks and surface irregularities created during the blending process 605. Any appropriate polishing technique known in the art may be used. Suitable polishing techniques include, but are not limited to, polishing with a diamond powder-coated tool bit of up to 3 mm radius and/or polishing with fine-grit stones.

Factors which determine suitable polishing techniques and compounds may include costs, accessibility of supplies and equipment, and the finish provided by such techniques and compounds.

In the embodiment of the invention illustrated by method 100, following polishing 610, the edges of the cooling slots in one or more of the bucket attachment dovetail regions may be subjected to shot-peening 615. Any appropriate peening technique known in the art may be used. Suitable peening techniques include, but are not limited to, steel shot peening, laser peening, ceramic peening, and ultrasonic peening. In some embodiments, steel shot peening may not be suitable due to the potential for shot residue to be deposited in the cooling slots. In one embodiment, the peening technique 615 may be a closed-system shot-peening process, as discussed in "Technical Information Letter 1539-2," GE Engineering Product Service, Apr. 4, 2006; and "Technical Information Letter 1540-2," GE Engineering Product Service, Apr. 4, 2006. Factors which determine suitable peening techniques may include costs, accessibility of supplies and equipment, and the finish provided by such techniques.

In the embodiment of the invention illustrated by method 100, following peening 615, the edges of the cooling slots in one or more of the bucket attachment dovetail regions may be coated 620 with a protective, oxidation-resistant coating. The coating may extend beyond these edges on the adjacent surfaces by several millimeters or more. In some instances, the coating may be applied by submersion, drip application, spray application, paint application, bulk application, vapor deposition, low or reduced pressure plasma spray, air plasma spray, electron beam physical vapor deposition, electroplating, cathodic arc application, pack aluminide application, overpack aluminide application, or any other appropriate technique known in the art. Factors such as costs and accessibility of equipment may limit preferred embodiments to application of coating by spray and/or bulk applicator. As would be understood by one of ordinary skill in the art, it is often desirable to grit blast the surface with aluminum oxide prior to application of coating. Suitable coating compounds may be capable of sustaining typical turbine temperatures and pressures. Suitable coating compounds may be rich in aluminum. As used herein, "rich in aluminum" may refer to compounds which contain from about 5% to about 30% by mass. Suitable coating compounds include, but are not limited to, multilayer inorganic coatings, such as SermeTel® Process 2F-1 Coating System, commercially available from Sermatech International of Pottstown, Pa., or IPCote Range of Products, commercially available from Indestructive Paints Limited, of Birmingham, UK. In one embodiment, the coating may be between about 0.5μ and about 40μ thick. To achieve a desired thickness, the coating technique 620 may be performed one or more times per edge. As would be understood by one of ordinary skill in the art with the benefit of this disclosure, a curing period may follow application of coating. Curing periods may last for about twelve hours at temperatures of about 800° F. In some instances, it may be useful to peen the edges following coating, inter alia, to smooth or refine the finish of the coating.

Figure 7:
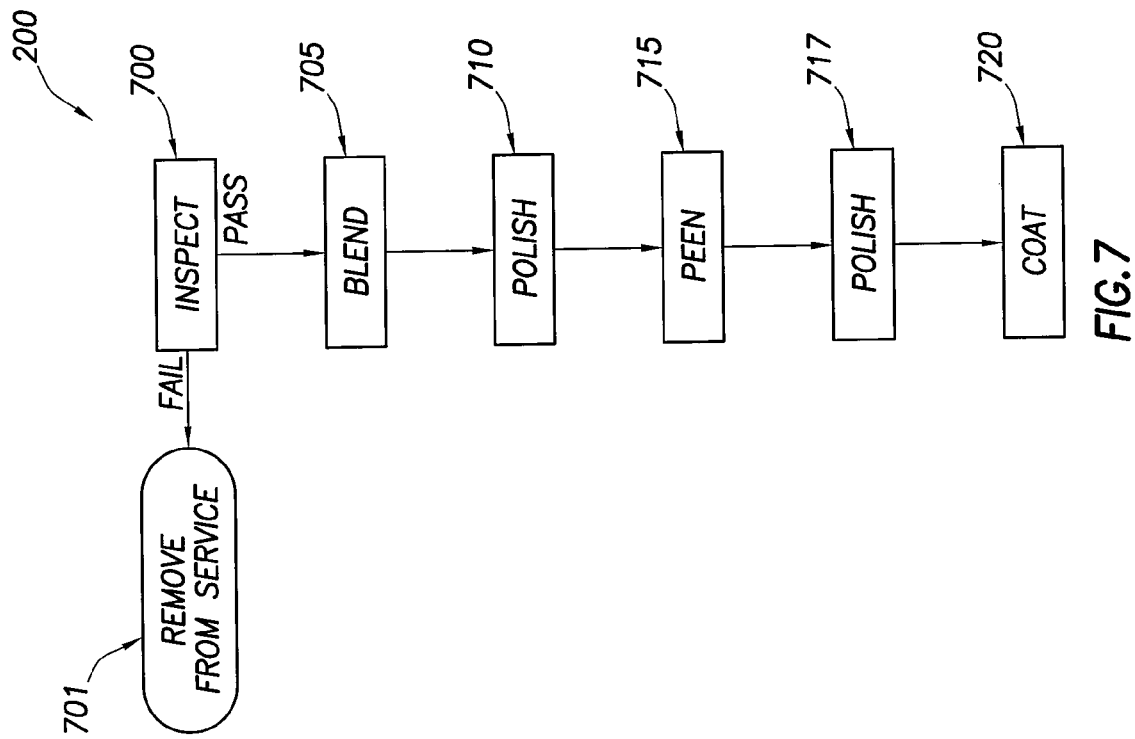
FIG. 7 is a diagram of a method of maintaining a turbine disc in accordance with another embodiment of the present invention.
Figure 8:
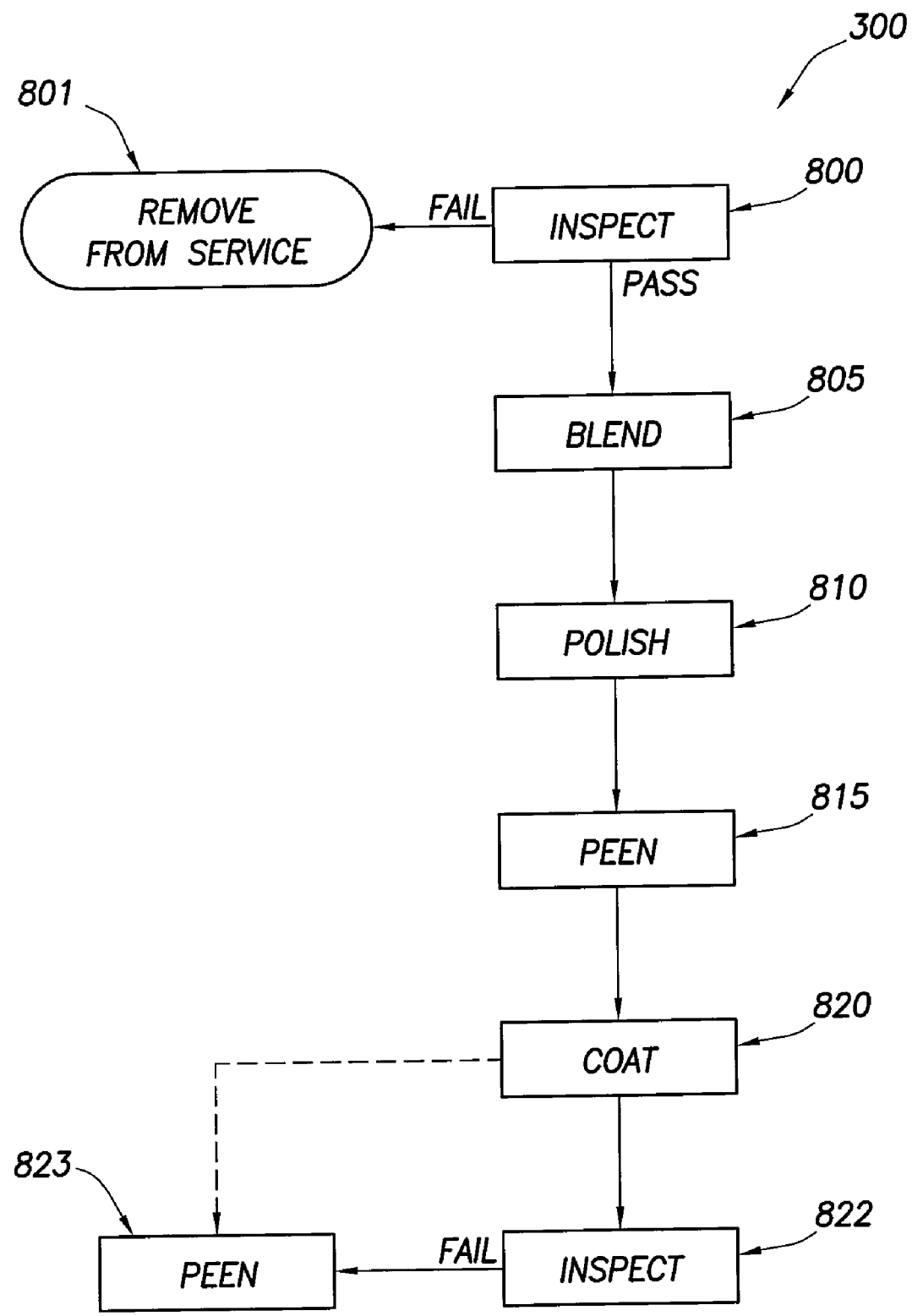
FIG. 8 is a diagram of a method of maintaining a turbine disc in accordance with yet another embodiment of the present invention.

In some instances, it may be desirable to re-order and/or repeat certain of the above-described steps. For example, as illustrated in FIG. 7, method 200 includes a second polishing step 717 after peening 715 and before coating 720 the edges of the cooling slots in one or more of the bucket attachment dovetail regions. As another example, as illustrated in FIG. 8, method 300 includes an inspection 822 following coating 820 of the edges and adjacent surfaces. Such an inspection 822 may detect, for example, irregularities or blemishes in the coating, and/or appropriate coverage of the coating (both in extent as well as in thickness). It may be useful to perform a second peening step 823 following coating, especially in instances wherein the second inspection 822 detects irregularities in the surface of the coating. A person of ordinary skill in the art with the benefit of this disclosure would be able to determine when re-ordered and/or repeated steps would be appropriate.

In some embodiments, the methods of this invention may be performed in conjunction with the methods and devices disclosed in U.S. patent application Ser. No. 11/383,986 (2007/0269316), Ser. No. 11/383,988 (2007/0269313), and Ser. No. 12/367,868 (unpublished), the entirety of which are hereby incorporated by reference in their entirety.

Figure 1:
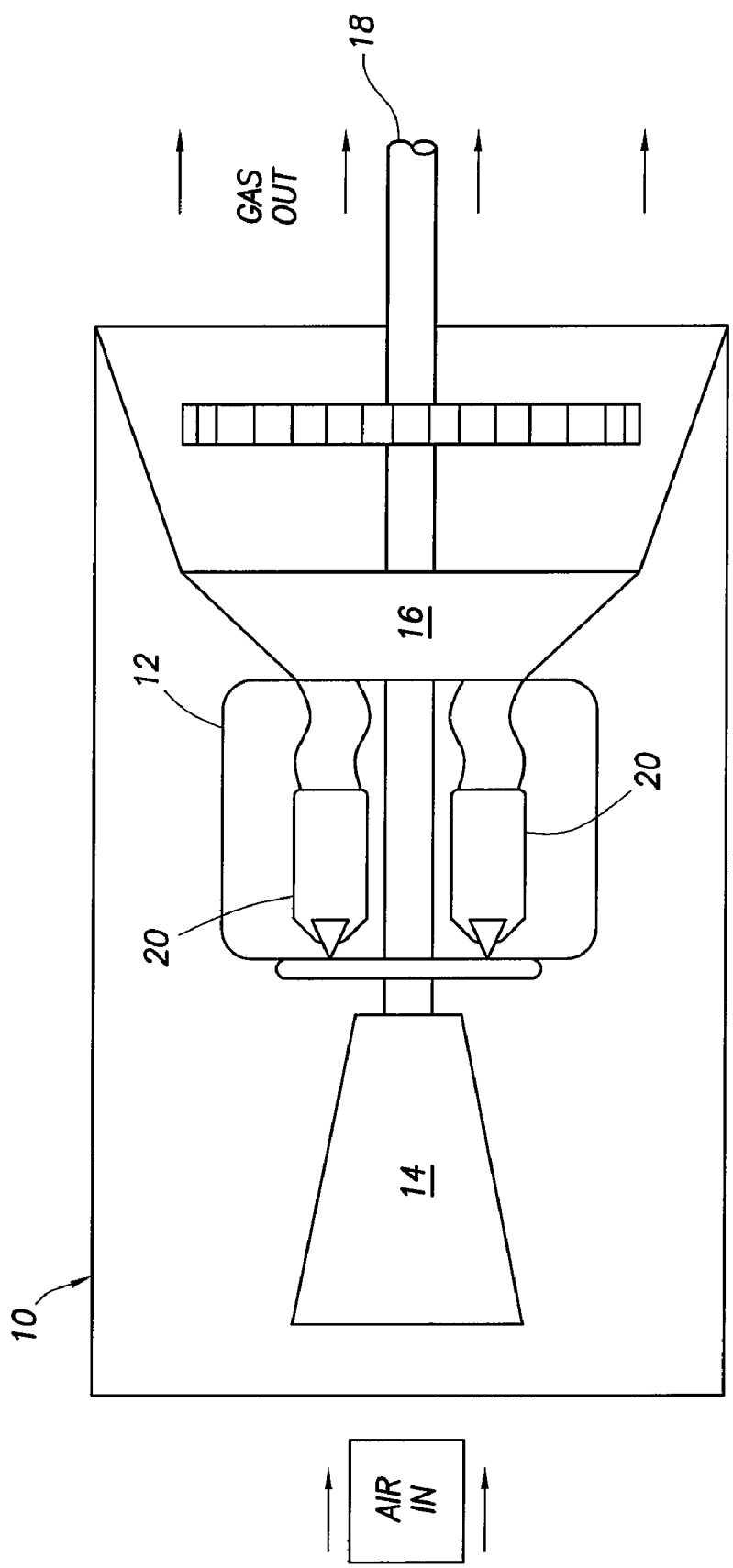
FIG. 1 is a schematic illustration of a typical gas turbine engine.
Figure 2:
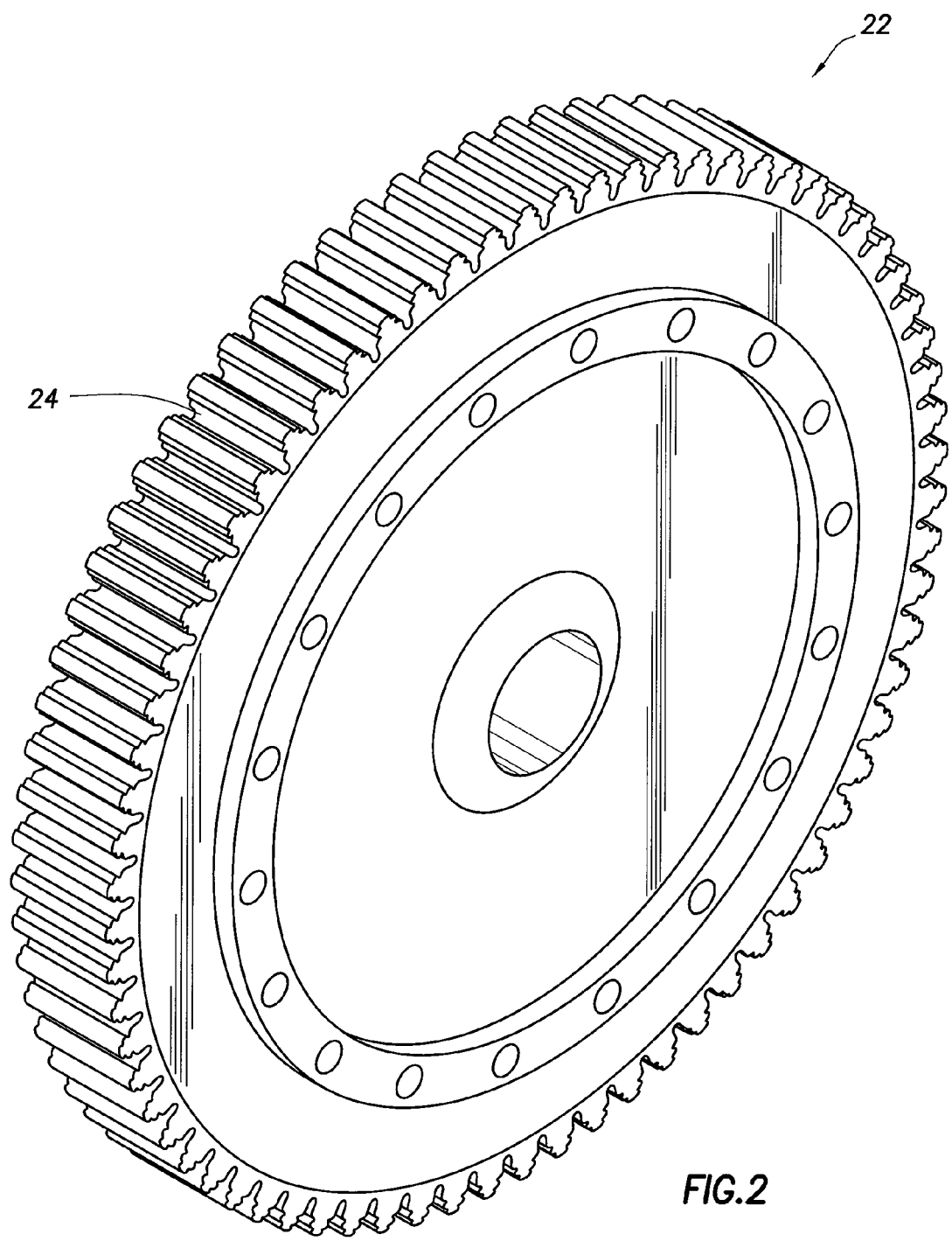
FIG. 2 illustrates a typical turbine disc.
Figure 3:
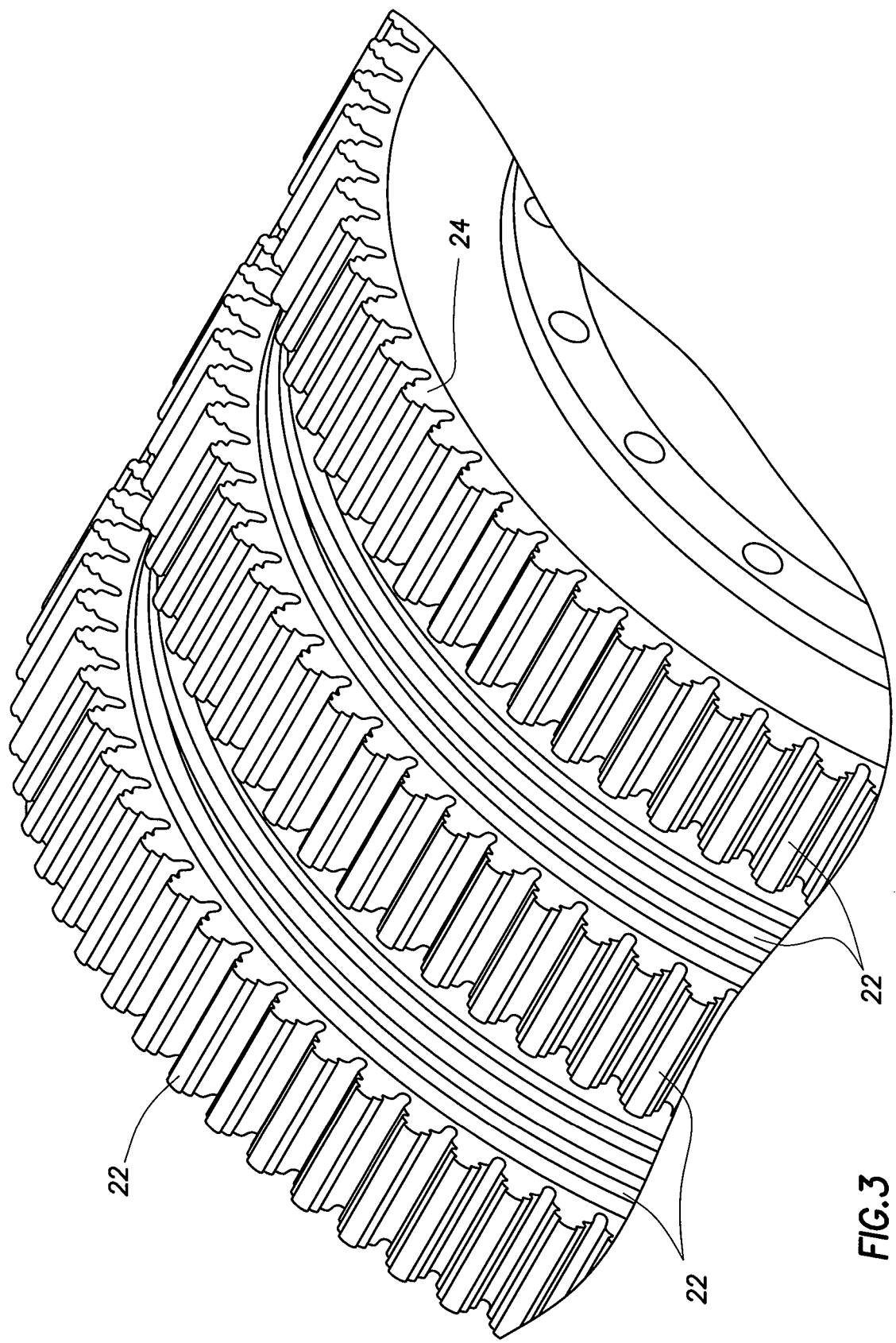
FIG. 3 illustrates a typical configuration of turbine discs in a typical gas turbine engine.
Figure 4B:
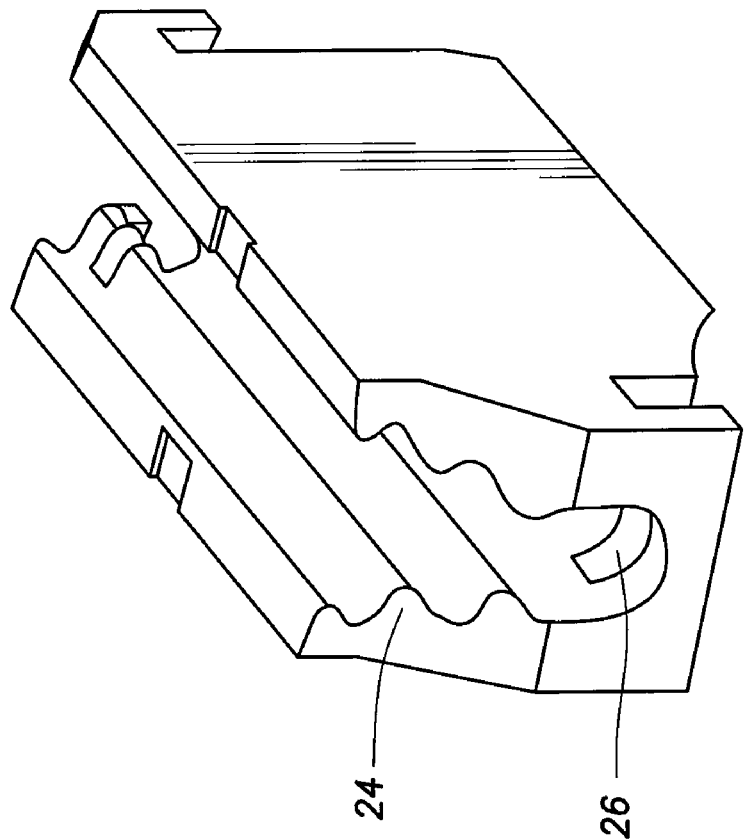
FIG. 4 illustrates typical first and second stage bucket attachment dovetail regions.
Figure 4A:
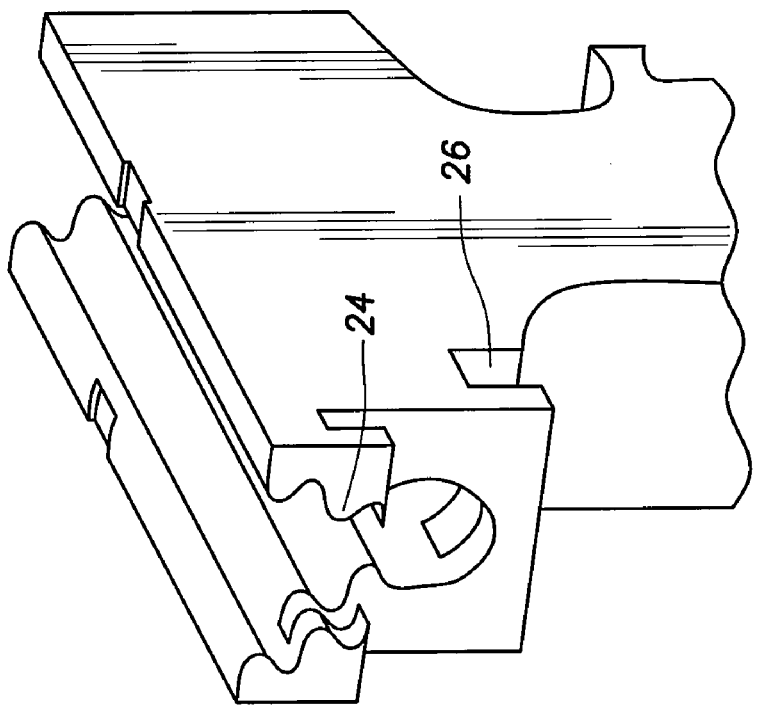
Figure 5B:
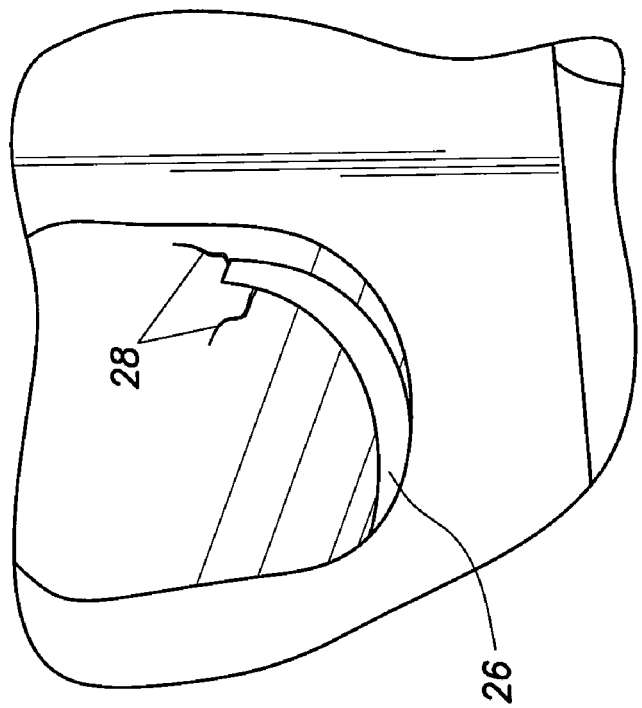
FIG. 5 illustrates typical cracking found in the bucket attachment dovetail region.
Figure 5A:
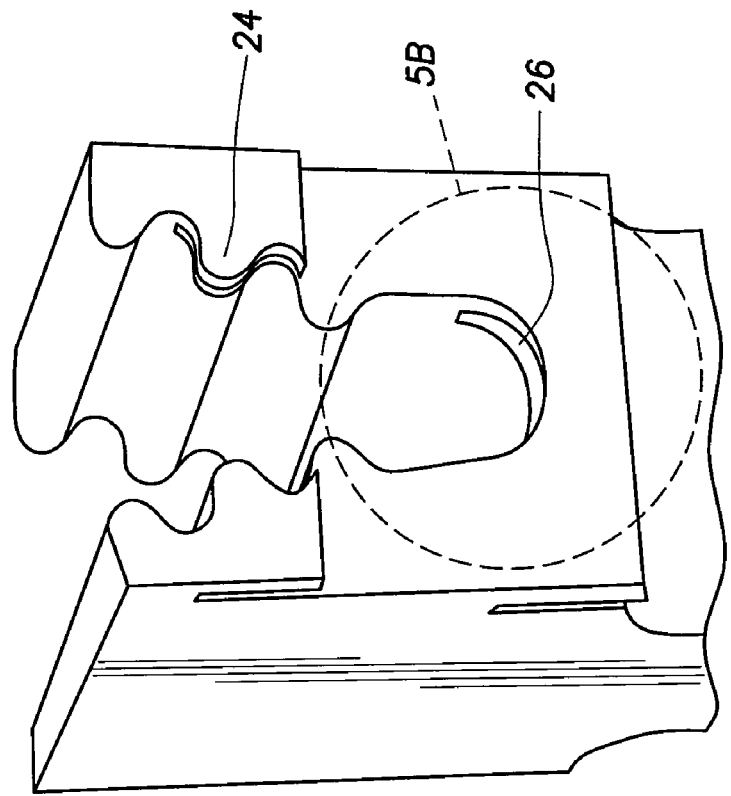

In reference to FIG. 1, the gas turbine 10 may be attached to a load or machinery (not shown), such as, but not limited to, a generator, and/or another gas turbine. Accordingly, a large gas turbine unit may actually include several gas turbines that are all co-axially coupled to the same drive shaft 18. Such a unit may, for example, include a high-pressure gas turbine, which is coupled to a low-pressure gas turbine. In one embodiment, gas turbine 10 is commercially available from General Electric Power Systems, Schenectady, N.Y.

While the above description refers to turbine discs in the first and second stages of the turbine, it should be understood that the inventive method may be applied to turbine discs in any stage of a turbine. The inventive method may be applied to both turbine discs which were shot-peened during manufacture and to turbine discs which have not been shot-peened. The methods of this invention may be applied in conjunction with modification of a turbine disc with bucket attachment dovetails which have relief cut modifications to either or both the dovetail pressure face or lockwire tab locations. Although the steps of the inventive method have been described in a particular, linear order, the scope of the inventive method includes performing the steps in any order and repeating one or more steps to provide desired results.

If there is any conflict in the usages of a word or term in this specification and one or more patent or other documents that may be incorporated herein by reference, the definitions that are consistent with this specification should be adopted for the purposes of understanding this invention.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Moreover, the indefinite articles "a" or "an", as used in the claims, are defined herein to mean one or more than one of the element that it introduces. Also, the terms in the claims have their plain, ordinary meaning unless otherwise explicitly and clearly defined by the patentee.

What is claimed is:

1. A method of maintaining a turbine disc, wherein the turbine disc comprises a plurality of bucket attachment dovetail regions, one or more of the bucket attachment dovetail regions comprises a cooling slot, and each cooling slot comprises edges and adjacent surfaces, the method comprising:

blending the edges of the at least one of the cooling slots creating blended edges;

polishing the edges of the at least one of the cooling slots creating polished edges after the blending step;
peening the edges of the at least one of the cooling slots creating peened edges after the polising step; and
coating the edges and adjacent surfaces of at least one of the cooling slots creating coated edges and adjacent surfaces after the peening step.

2. The method according to claim 1, further comprising at least one step selected from the group of steps consisting of:
inspecting the one or more of the bucket attachment dovetail regions comprising a cooling slot to confirm that each bucket attachment dovetail region meets predetermined minimum standards;
polishing the peened edges of the at least one of the cooling slots;
inspecting the coated edges and adjacent surfaces of the at least one of the cooling slots; and
peening the coated edges of the at least one of the cooling slots.

3. The method according to claim 2, wherein inspecting the one or more bucket attachment dovetail regions comprising a cooling slot comprises a non-destructive inspection technique.

4. The method according to claim 2, wherein the predetermined minimum standards comprise the absence of any linear feature of approximately 1 millimeter or longer.

5. The method according to claim 2, wherein the method is performed at every Hot Gas Path Inspection interval.

6. The method according to claim 2, wherein the method is performed at every Major Inspection interval.

7. The method according to claim 1, wherein coating the edges and adjacent surfaces of at least one of the cooling slots is performed by a technique comprising at least one technique selected from the group consisting of: submersion, drip application, spray application, paint application, bulk application, vapor deposition, plasma spray, electron beam physical vapor deposition, electroplating, cathodic arc application, pack aluminide application, overpack aluminide application, and any combination thereof.

8. The method according to claim 1, wherein coating the edges and adjacent surfaces of at least one of the cooling slots comprises applying a coating compound rich in aluminum.

9. The method according to claim 1, wherein coating the edges and adjacent surfaces creates a coating thickness of about 0.5µ to about 40µ.

10. The method according to claim 1, wherein the turbine disc is a first or second stage turbine disc.

11. The method according to claim 1, wherein blending the edges of the at least one of the cooling slots comprises blending the edges to a radius of about 1 mm to about 5 mm.

12. The method according to claim 1, wherein blending the edges of the at least one of the cooling slots comprises blending the edges to a radius between about 25% and about 75% of the edge radius prior to blending.

13. The method according to claim 1, wherein inspecting precedes blending, which precedes polishing, which precedes peening, which precedes coating.

14. A method of maintaining a gas turbine, wherein the gas turbine comprises one or more turbine discs, at least one of the turbine discs comprises a plurality of bucket attachment dovetail regions, one or more of the bucket attachment dovetail regions comprises a cooling slot, and each cooling slot comprises edges and adjacent surfaces, the method comprising
blending the edges of the at least one of the cooling slots creating blended edges;
polishing the edges of the at least one of the cooling slots creating polished edges after the blending step;
peening the edges of the at least one of the cooling slots creating peened edges after the polishing step; and
coating the edges and adjacent surfaces of at least one of the cooling slots creating coated edges and adjacent surfaces after the peening step.

15. The method according to claim 14, further comprising at least one step selected from the group of steps consisting of:
inspecting the one or more of the bucket attachment dovetail regions comprising a cooling slot to confirm that each bucket attachment dovetail region meets predetermined minimum standards;
polishing the peened edges of the at least one of the cooling slots;
inspecting the coated edges and adjacent surfaces of the at least one of the cooling slots; and
peening the coated edges of the at least one of the cooling slots.

16. The method according to claim 15, wherein the predetermined minimum standards comprise the absence of any linear feature of approximately 1 millimeter or longer.

17. The method according to claim 14, wherein coating the edges and adjacent surfaces of at least one of the cooling slots is performed by a technique comprising at least one technique selected from the group consisting of: submersion, drip application, spray application, paint application, bulk application, vapor deposition, plasma spray, electron beam physical vapor deposition, electroplating, cathodic arc application, pack aluminide application, overpack aluminide application, and any combination thereof.

18. The method according to claim 14, wherein coating the edges and adjacent surfaces of at least one of the cooling slots comprises applying a coating compound rich in aluminum.

19. The method according to claim 14, wherein the at least one turbine disc is a first or second stage turbine disc.

20. A method of maintaining a turbine disc bucket attachment dovetail region, wherein the bucket attachment dovetail region comprises a cooling slot, and the cooling slot comprises edges and adjacent surfaces, the method comprising:
inspecting the one or more of the bucket attachment dovetail regions comprising a cooling slot to confirm that each bucket attachment dovetail region meets predetermined minimum standards, wherein the predetermined minimum standards comprise the absence of any linear feature of approximately 1 millimeter or longer;
blending the edges of the at least one of the cooling slots only if each of the bucket attachment dovetail regions comprising a cooling slot meets the predetermined minimum standards;
polishing the blended edges of the at least one of the cooling slots after the blending step;
peening the polished edges of the at least one of the cooling slots after the polishing step; and
coating the peened edges and adjacent surfaces of at least one of the cooling slots after the peening step;
wherein coating the edges and adjacent surfaces of at least one of the cooling slots comprises applying a coating compound rich in aluminum.

* * * * *